United States Patent
Hartwell et al.

(10) Patent No.: US 11,698,895 B2
(45) Date of Patent: Jul. 11, 2023

(54) ACCESS CONTROL FOR A DATABANK SYSTEM

(71) Applicant: Capital One Services, LLC, McLean, VA (US)

(72) Inventors: Andrew Troy Hartwell, Prosper, TX (US); Siwatm Piyasirisilp, Herndon, VA (US); Suresh Vadigi, Kennette Square, PA (US); Neeraj Sharma, Glen Allen, VA (US); Jason Bean, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 175 days.

(21) Appl. No.: 17/183,578

(22) Filed: Feb. 24, 2021

(65) Prior Publication Data
US 2022/0269665 A1    Aug. 25, 2022

(51) Int. Cl.
*G06F 16/23*    (2019.01)
*G06F 21/62*    (2013.01)
(Continued)

(52) U.S. Cl.
CPC ............ *G06F 16/2343* (2019.01); *G06F 9/54* (2013.01); *G06F 21/6218* (2013.01); *G06F 3/0484* (2013.01)

(58) Field of Classification Search
CPC .................................................. G06F 16/2343
See application file for complete search history.

(56) References Cited

U.S. PATENT DOCUMENTS 8,069,106 B2    11/2011    Waelbroeck et al.
8,738,704 B2     5/2014    Stark et al.
(Continued)

FOREIGN PATENT DOCUMENTS

WO    2017187207 A1    11/2017

OTHER PUBLICATIONS

Enhanced Batch Processing in RITS—Jan. 4, 2020. Settlement-Only Batch, Reserve Bank of Australia [online], Jan. 2020 [rtrv'd Sep. 4, 2022], Rtrv'd from Internet: <URL: https://www.rba.gov.au/payments-and-infrastructure/rits/information-papers/enhanced-batch-processing-in-rits/settlement-only-batch .html>, pp. 1-8.

*Primary Examiner* — Baoquoc N To
(74) *Attorney, Agent, or Firm* — Sterne, Kessler, Goldstein & Fox P.L.L.C.

(57) ABSTRACT

Disclosed herein are system, method, and computer program product embodiments for managing a databank system. The databank system may have multiple databanks and each databank may have one or more repositories storing records (e.g., test data). The databank system exposes an application programming interface (API) and the databank system is managed by transmitting API calls to the exposed API. These API calls may be displayed to a user via GUI such that the user can copy the API call and paste the API call (or a modified version of the API call) into the code of other software application. Further, the databank system enables the owner of a databank or repository to share the databank or repository with other users accordingly to various access privileges. Further still, the databank system enables individual records to be reserved by a user, rendering the record invisible to other users until an expiration.

20 Claims, 12 Drawing Sheets

(51) Int. Cl.
  *G06F 9/54*    (2006.01)
  *G06F 3/0484*    (2022.01)

(56) References Cited

U.S. PATENT DOCUMENTS

| | | |
|---|---|---|
| 8,904,239 B2 | 12/2014 | Seren et al. |
| 9,632,944 B2 * | 4/2017 | Wang .................. G06F 12/0891 |
| 9,965,758 B2 | 5/2018 | Zaidi et al. |
| 10,181,120 B1 | 1/2019 | Holmes et al. |
| 10,204,380 B1 | 2/2019 | Moore et al. |
| 10,225,330 B2 | 3/2019 | Palladino et al. |
| 10,339,513 B1 | 7/2019 | Walters et al. |
| 10,592,876 B2 | 3/2020 | Florimond |
| 10,606,565 B2 | 3/2020 | Douglas et al. |
| 10,628,420 B2 | 4/2020 | Devine et al. |
| 2006/0168513 A1 | 7/2006 | Coulson et al. |
| 2012/0059882 A1 | 3/2012 | Stark et al. |
| 2013/0254376 A1 | 9/2013 | Kudikala et al. |
| 2014/0317048 A1 * | 10/2014 | Wang .................. G06F 16/2379 |
| | | 707/607 |
| 2017/0249622 A1 | 8/2017 | Ortiz et al. |
| 2017/0293902 A1 | 10/2017 | Florimond |
| 2018/0046939 A1 | 2/2018 | Meron et al. |
| 2018/0081787 A1 | 3/2018 | Riddick et al. |
| 2018/0144276 A1 | 5/2018 | Neravati |
| 2018/0349134 A1 | 12/2018 | Studer et al. |
| 2019/0068622 A1 | 2/2019 | Lin et al. |
| 2019/0141006 A1 | 5/2019 | Schnitt |
| 2019/0278637 A1 | 9/2019 | Sukhija et al. |
| 2020/0152297 A1 | 5/2020 | Freeburg, II et al. |
| 2022/0188828 A1 | 6/2022 | Lu et al. |

\* cited by examiner

Health

- /DataBank/Health/Healthy  Check that the API is responding
- /DataBank/Health/environment

Owners

- /DataBank/Owners/{dataBank}  Save the owners list of a databank.
- /DataBank/Owners/{dataBank}/{repository}  Save the owners list of a repository.

Sharing

- /DataBank/{dataBank}/Share  Share a databank.
- /DataBank/{dataBank}/Private  Set a databank to private.
- /DataBank/{dataBank}/Public  Set a databank to public.
- /DataBank/{dataBank}/{repository}  Share a repository
- /DataBank/{dataBank}/{repository}/Share  Share a repository
- /DataBank/{dataBank}/{repository}/Private  Set a repository to private.
- /DataBank/{dataBank}/{repository}/Public  Set a repository to public

Statistics

- /DataBank/Statistics/{dataBank}/{resultCount}  Get a list of the top most queried keys for all repositories in a databank.

TemplateDataset

- /DataBank/TemplateDataset/{templateName}  Create a template dataset.
- /DataBank/TemplateDataset  Get a list of all template datasets.

Example API Calls 805A

FIG. 8A

DataBank

| Method | Endpoint | Description |
|---|---|---|
| GET | /DataBank/DataBankList | Get a list of all available databanks. |
| GET | /DataBank/{dataBank}/RepositoryList | Get a list of all available repositories within a databank. |
| GET | /DataBank/{dataBank}/{repository}/GetKeys | Get a list of all keys within the outer JSON data of a repository. |
| PUT | /DataBank/{dataBank} | Create a new databank. |
| DELETE | /DataBank/{dataBank} | Delete a databank. |
| PUT | /DataBank/{dataBank}/{repository} | Create a new repository within a databank. |
| DELETE | /DataBank/{dataBank}/{repository} | Delete a repository within a databank. |
| GET | /DataBank/{dataBank}/{repository}/dataTitle | |
| GET | /DataBank/{dataBank}/{repository}/Search | Query a repository. |
| GET | /DataBank/TextSearch/{dataBank}/{textSearch} | Search for a text string within the JSON data in a repository. |
| PUT | /DataBank/{dataBank}/{repository}/reserve | Reserve data within a repository. |
| GET | /DataBank/searchtags | Get all available search tags. |
| GET | /DataBank/searchtags/{searchTag} | Get repositories associated with a given search tag. |
| PUT | /DataBank/{dataBank}/{repository}/searchtags | Update a repository's search tags. |
| PUT | /DataBank/{dataBank}/DataBankDefinition | Update the DataBank details. |
| GET | /DataBank/{dataBank}/{repository}/{dataTitle}/GetRecords | Get DataTitle Records in DataBank Repository. |

Example API Calls 805B

FIG. 8B

Request URL: https://cloud.company.com/databank/RDT_DATA/Credit%20Cards/reserve

Request Method: PUT

Headers:
authority: cloud.company.com
accept: application/json, text/plain, */*
accept-encoding: gzip, deflate, br
accept-language: en-US,en;q=0.9
authorization: Bearer Body:
{"reservationEndDate":"12/1/2030, 2:34:00 PM","ids":[1],"userId":"abc"}

FIG. 8C

Request URL: https://cloud.company.com/databank/RDT_DATA/Credit%20Cards/share

Request Method: PUT

Headers:
authority: cloud.company.com
accept: */*
accept-encoding: gzip, deflate, br
accept-language: en-US,en;q=0.9
authorization: Bearer Body:

[{"userId":"xyz","userEmail":"firstName.lastName@company.com","allowRead":true,"allowReserve":true,"allowInsert":false,"allowUpdate":false,"allowDelete":false}]

FIG. 8D

ACCESS CONTROL FOR A DATABANK SYSTEM

BACKGROUND

Computer systems and software are typically rigorously tested before being deployed. The testing is often accomplished by generating or retrieving test data covering various scenarios including corner cases. The computer systems and/or software input the test data and then generate outputs based on the test data. These outputs may be compared with expected outputs to confirm the computer systems and software are operating correctly and to identify potential bugs for correction before deployment.

Generating quality test data is a complex process. Accordingly, once the test data is generated, it should be readily accessible by future computer systems and software under test, and by other individuals involved in the testing process.

BRIEF DESCRIPTION OF THE DRAWINGS/FIGURES

The accompanying drawings are incorporated herein and form a part of the specification.

FIGS. 8A and 8B show example API calls for managing a databank system in accordance with one or more embodiments.

FIG. 8C shows an example API call for reserving a record in accordance with one or more embodiments.

FIG. 8D shows an example API call for sharing a repository in accordance with one or more embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, and/or computer program product embodiments for managing and operating a databank system. The databank system may have multiple databanks and each databank may have one or more repositories storing records (e.g., test data). The databank system exposes an application programming interface (API) and the databank system is managed by transmitting API calls (e.g., API requests) to the exposed API. These API calls may be displayed to a user via a GUI such that the user can copy the API call and paste the API call (or a modified version of the API call) into the code of other software application. Further, the databank system enables the owner of a databank or repository to share the databank or repository with other users according to various access privileges. Further still, the databank system enables individual records to be reserved by a user, rendering the record invisible to other users until an expiration.

Figure 1:
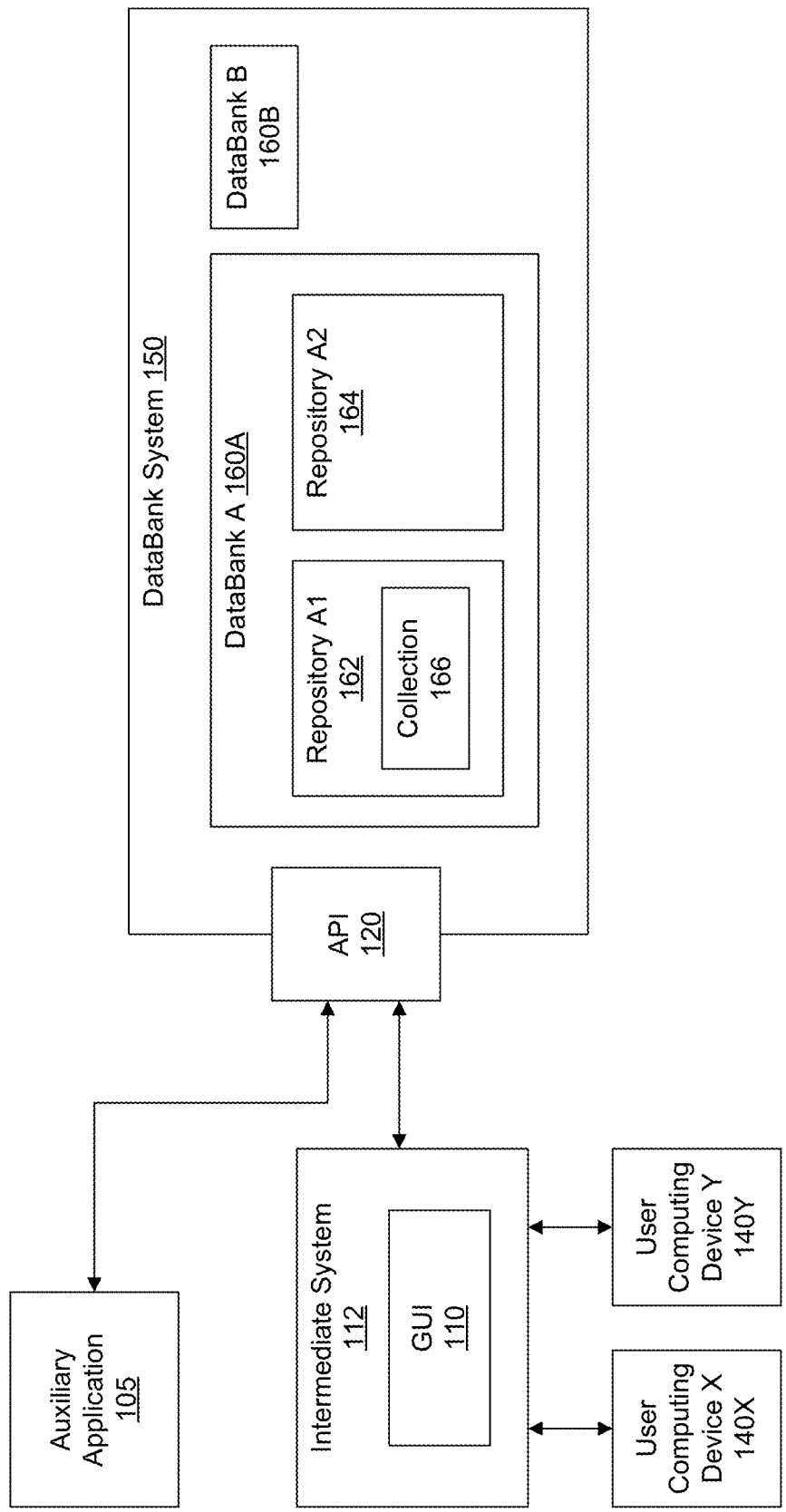
FIG. 1 shows a system for managing a databank system in accordance with one or more embodiments.

FIG. 1 shows a system for managing a databank system in accordance with one or more embodiments. As shown in FIG. 1, the system has multiple components including, for example, databank system 150, application programming interface (API) 120, auxiliary application 105, intermediate system 112, and one or more user computing devices (e.g., user computing device X 140X, user computing device Y 140Y). Databank system 150, API 120, auxiliary application 105, and intermediate system 112 may execute on one or more computing devices (e.g., server, mainframe, desktop personal computer (PC), laptop, smart phone, tablet PC, etc.) connected by one or more networks having wired and/or wireless segments. Moreover, two or more of the components (105, 112, 120, 150) may execute on the same computing device.

Databank system 150 manages one or more databanks (e.g., databank A 160A, databank B 160B). Each databank 160 has one or more repositories, and each repository has one or more collections of records. For example, databank A 160A includes repository A1 162 and repository A2 164, and repository A1 162 includes a collection 166. Records belonging to the same collection have the same set of fields (though the fields may be populated with different values), while records belonging to different collections may have different sets of fields.

In one or more embodiments, the records in databank system 150 correspond to test authorizations and settlements associated with credit card or debit card transactions. In other words, the records may correspond to simulated credit card or debit card transactions. This test data may be used by developers to test financial computer systems and software application prior to deployment.

In one or more embodiments, a databank or repository has one or more owners. The owners may correspond to the creators of the databank or repository. The owners of a databank may designate the databank as private or public. A public databank is accessible to all users. In contrast, a private databank is accessible to the owners and other users with whom the owners have shared the databank (discussed below). Similarly, the owners of a repository may designate the repository as private or public.

In one or more embodiments, individual records within a repository may be reserved. When a record is reserved by a user, it effectively becomes invisible to other users. In other words, the other users (or software applications) cannot view a reserved record, the other (or software applications) users cannot edit or delete a reserved record, and the reserved record will not appear in any search results triggered by queries from the other users (or other software applications). A record may be reserved indefinitely. Additionally or alternatively, the record will remain reserved until a specified expiration (e.g., date, time, event, condition, etc.). In one or more embodiments, the owner(s) of the databank or repository may still access a reserved record. In one or more embodiments, reserving the record keeps the record confidential since it cannot be viewed by other users or software applications. In one or more embodiments, reserving the record prevents the record from being modified, either accidentally or maliciously, by another user or another software application. This effectively maintains the integrity of the data in the record for the duration of the reservation.

In one or more embodiments, the owners of a database or repository may share the database or repository with other users or other software applications according to various access privileges. Access privileges may include the ability to view records in the repository or databank (e.g., via API calls), the ability to edit or delete records in the repository or databank (e.g. via API calls), the ability to reserve records in the repository or databank (e.g., via API calls), etc. Different users may be given different access privileges.

In one or more embodiments, each repository or databank in databank system 150 includes one or more tags. A tag is a description of the repository or databank. Each tag may be a single word or multiple words.

In one or more embodiments, databank system 150 includes a set of templates (not shown). Each template is a set of example fields. Different templates (e.g., templates having different fields) may be available for different industries. A template may be customized to include additional fields or edit or remove existing fields. A user may use a template as the basis for the records in the repository. Templates make it unnecessary for a user to build a repository or databank from the ground-up.

Databank system 150 exposes API 120. Managing databank system 150 and the data stored in databank system 150 is performed by transmitting API calls (e.g., API requests) to API 120. For example, generating databanks, generating repositories, generating or retrieving templates, sharing databanks or repositories, reserving records, adding or retrieving tags, querying databanks or repositories, editing or deleting records, etc., are executed by transmitting the corresponding API call to API 120. Databank system 150 performs the managing functions based on the API calls and returns the requested data, records, etc. in a response to the API call. API 120 may be a Representational State Transfer (REST) API and thus the API calls make use of the method types: GET, POST, PUT, PATCH, DELETE.

In one or more embodiments, intermediate system 112 generates GUI 110 and/or causes GUI 110 to be displayed on one or more computing devices of one or more users (e.g., user computing device X 140X, user computing device Y 140Y). GUI 110 may include one or more screens/windows each having one or more GUI elements or widgets (e.g., checkboxes, dropdown boxes, radio buttons, buttons, etc.). GUI 110 may also be configured to display retrieved records in a chart form (e.g., rows correspond to records, while columns correspond to fields). Further, GUI 110 may also be configured to display one or more of the API calls being transmitted to API 120.

A user may request database system 150 perform a function by manipulating one or more of the GUI elements or widgets. In response to receiving the request, intermediate system 112 may transmit the corresponding API call to API 120. In other words, intermediate system 112 may translate the requests from GUI 110 into API calls. Some of the data/parameters in the request may be included in the API call to API 120.

In one or more embodiments, auxiliary application 105 is an application that can request database system 150 perform a function by transmitting API calls to API 120 and receiving API responses from API 120. The API calls may be encoded in auxiliary application 105. The programmers of auxiliary application 105 may observe API calls displayed in GUI 110 and include the API calls, possibly with some modifications, in auxiliary application 105. Auxiliary application 105 might or might not have a GUI.

In one or more embodiments, auxiliary application 105 generates or utilizes test authorizations and settlements associated with credit card or debit card transactions. In other words, auxiliary application 105 may generate or utilize simulated credit card or debit card transactions. As discussed above, this test data may be stored in records within databank system 150.

Figure 7:
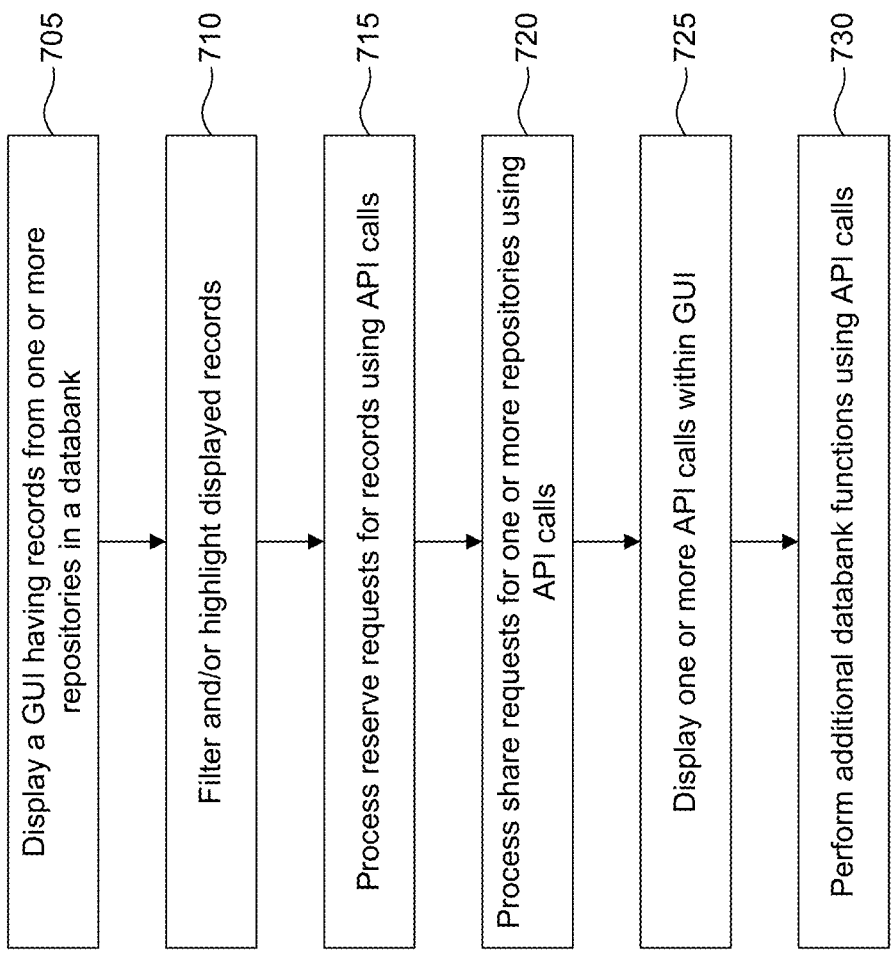
FIG. 7 shows a flowchart for managing a databank system in accordance with one or more embodiments.

FIG. 7 shows a flowchart for managing a databank in accordance with one or more embodiments. The steps in FIG. 7 may be executed by one or more of the components discussed above in reference to FIG. 1 (e.g., intermediate system 112, API 120, databank system 150, etc.). In one or more embodiments, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7. The steps shown in FIG. 7 may be implemented as computer-readable instructions stored on computer-readable media, where, when the instructions are executed, cause a processor to perform the process of FIG. 7

In Step 705, GUI 110 is displayed on a user computing device. GUI 110 includes records from one or more repositories belonging to the same or different databanks managed by databank system 150. The records may be displayed as rows in GUI 110.

Intermediate system 112 may generate GUI 110 by making one or more API calls (e.g., requests) to API 120, and then receiving a response with one or more records from databank system 150. The API call may be a request for all records of a repository or databank and the response includes all of the records. Additionally or alternatively, the API call may specify query parameters and the records in the response may satisfy (e.g., match) the query parameters. Intermediate system 112 may receive the records in one format (e.g., JSON) and may translate the records into any format suitable for inclusion within GUI 110. One or more fields of a record may be omitted and/or not displayed (e.g. hidden) in GUI 110. After generating GUI 110, intermediate system 112 may cause GUI 110 to be displayed on the user computing device.

In Step 710, the records in the displayed GUI are filtered and/or highlighted in response to a user request. For example, intermediate system 112 may receive a request from the user to highlight (e.g., change font color, change font size, change background color, etc.) the records in GUI 110 that are currently reserved by the user and/or that belong to repositories or databanks owned by the user (or another specified user). As another example, intermediate system 112 may receive a request from the user to filter out (e.g., hide) all records in GUI 110 that are not reserved by the user and/or that do not belong to a repository or databank owned by the user (or another specified user). The user may issue these requests by manipulating one or more GUI elements or widgets (e.g., checkbox) of GUI 110. The records received by intermediate system 112 may include ownership information and/or reserve information. This ownership information and/or reserve information may be used by intermediate system 112 to identify the records that should be highlighted and/or the records that should be filtered out and then execute the highlighting or filtering operations.

In Step 715, reserve requests are processed. A reserve request is a request by a user to lock a specific record. Once the record is reserved for a user, the record will not be returned in response to a query (e.g., API call) issued by another user (e.g., it will be as if the record does not even exist for other users). However, the reserved record will still be retrievable (e.g., for viewing or editing) for the user that requested the reserve. A record may be reserved indefinitely. Alternatively, the reserve request may specify an expiration (e.g., date, time, event, etc.) when the record will no longer be reserved (e.g., reserve is released). The user may issue the request by manipulating GUI elements or widgets (e.g., dropdown boxes, radio buttons, etc.) of GUI 110. Intermediate system 112 may receive the request and transmit an API call to API 120 to reserve the record until the expiration (if specified). Databank system 150 will prevent other users from viewing or accessing the reserved record in response to the API call. This API call may be referred to as an API access control call because it is being used to control access rights to a stored record.

FIG. 8C shows an example API call for reserving a record in accordance with one or more embodiments. In this example, databank "RDT DATA" has a repository called "Credit Cards". This API call reserves the record with ID of "1" within the "Credit Cards" repository for the user with ID "abc". The API call also requests that the record be reserved until (i.e., specifies an expiration) 2:34 pm on Dec. 1, 2030. As shown, the name of the databank and the name of the repository are in the request URL, while the expiration, the ID of the record, and the ID of the user are in the body. Once the record is reserved, the record might not be accessible, viewable, and/or editable to other users (e.g., a user with an ID different from "abc"). For example, an API call from another user to edit or view the reserved record may be ignored and/or discarded by the databank system. As another example, if the API call from another user attempts to edit or view multiple records including the reserved record, the databank system may enable the editing or viewing of the multiple records except the reserved record.

In Step 720, share requests are processed for one or more repositories. Each repository or each databank may have one or more owners. If a user is an owner of a repository or databank, the user may share the repository or databank with another user. Sharing the repository or databank may include granting one or more access privileges to another user including: rights to read records in the repository or databank, rights to reserve records in the repository or databank, rights to insert records in the repository or databank, rights to delete records in the repository or databank, etc. The user may issue the share request by manipulating GUI elements or widgets (e.g., dropdown boxes, radio buttons, check boxes, etc.) of GUI 110. The share request may specify the other user and the access privileges being extended to the other user. Intermediate system 110 may receive a share request via GUI 110 and then transmit an API call to API 120 to share the repository or databank according to the access privileges. Databank system 150 will grant the other user(s) access to the repository or databank based on the specified access privileges. This API call is also an example of an API access control call because it is used to control access rights to a repository and/or databank.

FIG. 8D shows an example API call for sharing a repository in accordance with one or more embodiments. In this example, databank "RDT DATA" has a repository called "Credit Cards". The "Credit Cards" repository is to be shared with the user with ID "xyz". The user with ID "xyz" will be given access privileges to read and reserve records in the "Credit Cards" repository. However, the user with ID "xyz" will not be given the access privileges of inserting, updating, or deleting records in the "Credit Cards" repository. As shown, the name of the databank and the name of the repository are in the request URL, while ID of the user and the access privileges being granted to the user are in the body.

In Step 725, one or more API calls are displayed within GUI 110. As discussed above, databank system 150 and the data in databank system 150 are managed and controlled using API calls to API 120. The user may request that one or more of the API calls transmitted to API 120 be displayed within GUI 110. In one or more embodiments, the user may copy the displayed one or more API calls for inclusion in the code of other applications (e.g., auxiliary application 105) such that these other applications may access databank system 150 and utilize the data stored in one or more of the databanks and repositories. These other applications might or might not have a GUI.

In Step 730, additional databank functions are performed. Specifically, intermediate system 112 may receive a request from the user to perform a databank function (e.g., via the manipulation of GUI components in GUI 110), and intermediate system 112 transmits an API call to API 120 to cause databank system 150 to perform the databank function. Example databank functions include generating databanks, generating repositories, generating or retrieving templates, adding or retrieving tags, querying databanks or repositories, editing or deleting records, etc. API 120 may send back an API response.

Figure 2:
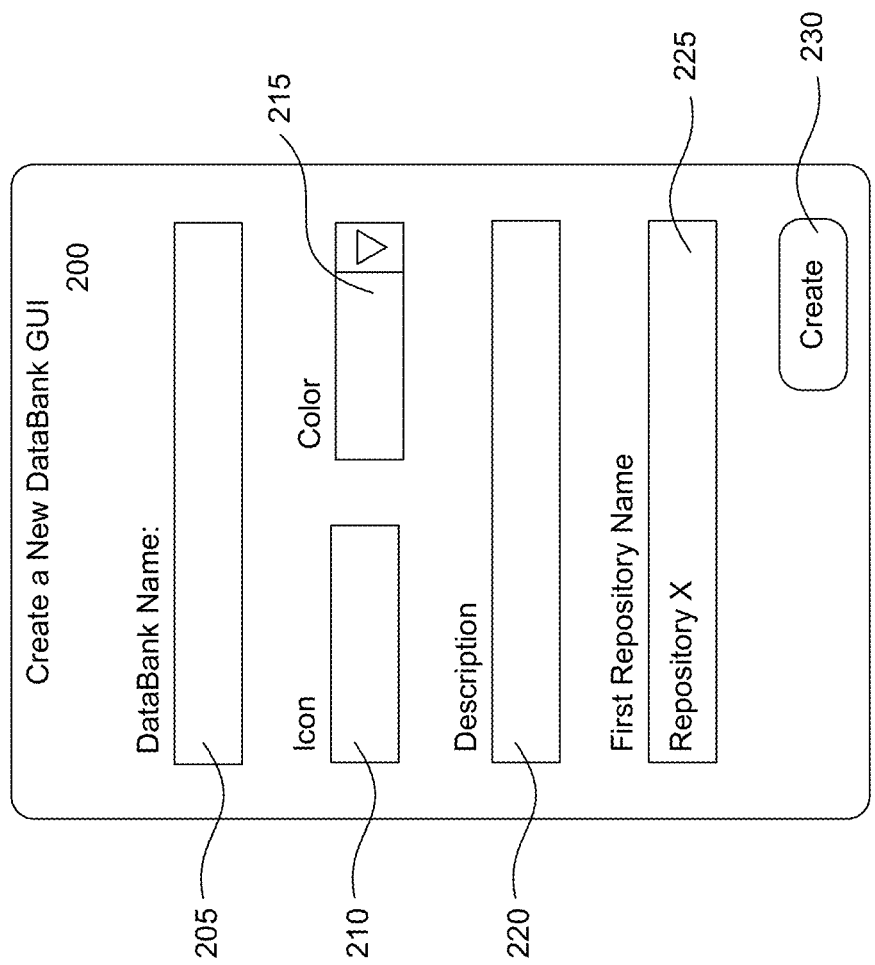
FIGS. 2-6 show example GUIs for managing a databank system in accordance with one or more embodiments.

FIG. 2 shows an example GUI 200 for managing a databank system in accordance with one or more embodiments. Specifically, GUI 200 is used to create a new databank and may correspond to GUI 110, discussed above in reference to FIG. 1.

As shown in FIG. 2, GUI 200 has databank name textbox 205, description textbox 220, and first repository name textbox 225. These textboxes enable the user to enter the name of the new databank, a description for the new databank, and the name of the first repository in the databank, respectively. GUI 200 also includes icon dropdown box 210 and color dropdown box 215. These textboxes enable the user to select an icon associated with the new databank and the color associated with the new databank, respectively. For example, when a list of databanks is displayed, the name of this new databank may be displayed in the selected color within the list, and the selected icon may be displayed adjacent to the name of this new databank.

In one or more embodiments, in response to selecting create button 230, a request to create the new databank is transmitted to and received by intermediate system 112. The request includes the information entered via textboxes 205, 220, and 225, and the information selected via dropdown boxes 210 and 215. Intermediate system 112 may generate an API call based on the request and transmit the API call to API 120. The API call may include the entered or selected information. Databank system 150 may generate the new databank in accordance with the API call.

Figure 3:
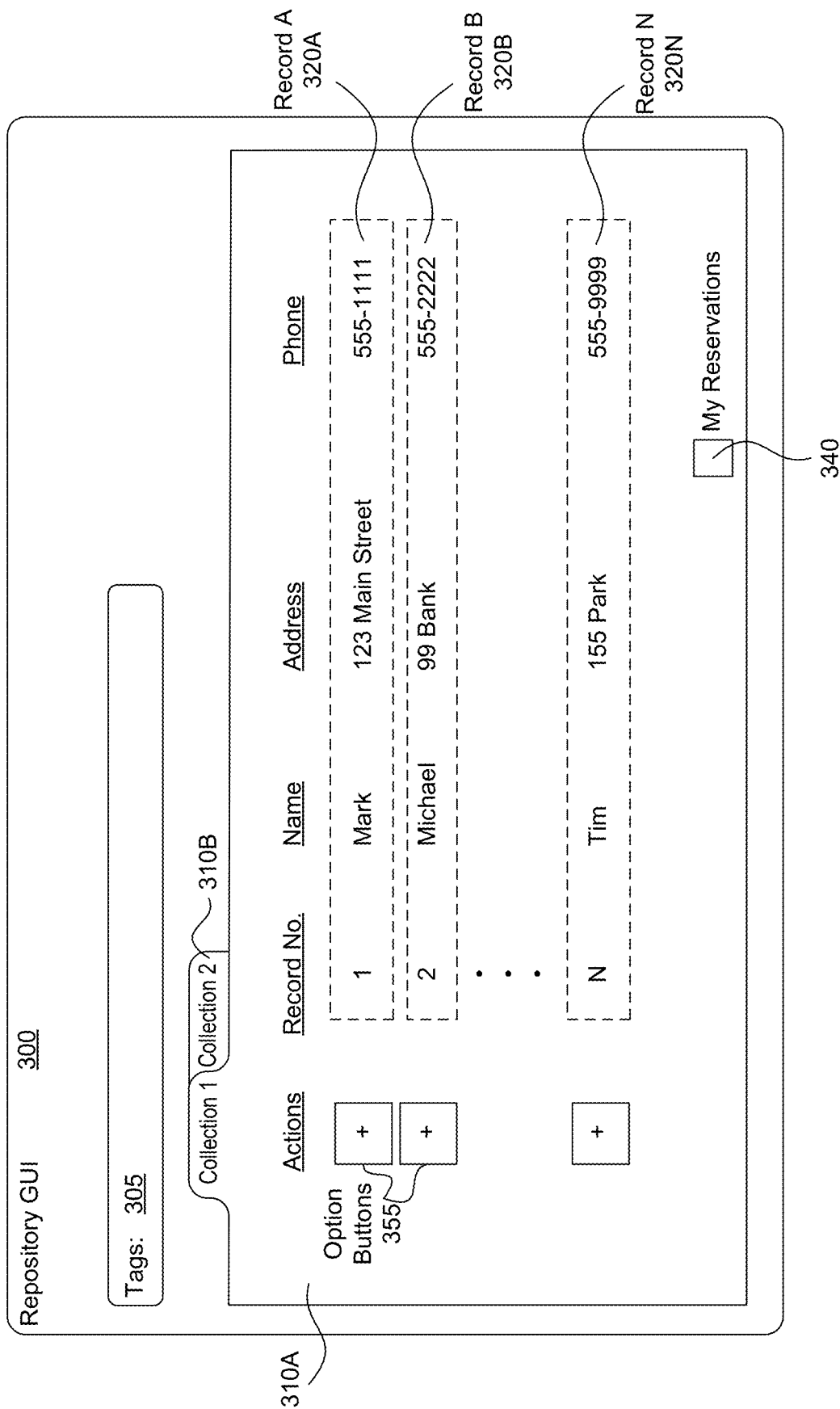

FIG. 3 shows an example GUI 300 for managing a databank system in accordance with one or more embodiments. Specifically, GUI 300 is used to view some or all of the records of a repository (e.g., repository A2 164). GUI 300 may correspond to GUI 110, discussed above in reference to FIG. 1. GUI 300 may also have the GUI functionality discussed in steps 705, 710, and 715 of FIG. 7.

As shown in FIG. 3, GUI 300 may have label 305 displaying one or more tags of the repository. As also shown in FIG. 3, GUI 300 may have multiple tabs corresponding to different collections within the repository. For example, tab 310A corresponds to collection 1 of the repository, while tab 310B corresponds to collection 2 of the repository.

Intermediate system 112 may generate GUI 300 by making one or more API calls (e.g., queries) to API 120, and then receiving a response with records and/or tags from databank system 150. The records received by intermediate system 112 may also include reserve information. The received records may be displayed in GUI 300 in a grid, where each record is a row and each column is a field. For example, tab 310A includes some or all of the records (e.g., record A 320A, record B 320B, record N 320N) of collection 1. Some fields of the received records might not be displayed.

GUI 300 may also include a my reservations checkbox 340. When the user manipulates (e.g., selects) my reservations checkbox 340, this sends a request to intermediate system 112 to highlight (e.g., change font color, change font size, change background color, etc.) the subset of displayed records that are reserved by the user. Additionally or alternatively, when the user selects my reservation checkbox 340, this sends a request to intermediate system 112 to filter out (e.g., hide) all records in GUI 300 that are not reserved by the user. As discussed above, the records received by intermediate system 112 may include reserve information. This reserve information may be used by intermediate system 112 to identify the records 320 in GUI 300 that should be highlighted and/or the records 320 in GUI that should be filtered out and then execute the highlighting or filtering operations.

In one or more embodiments, an options button 355 is displayed adjacent to each record 320 in GUI 300. In response to manipulating (e.g., selecting) an option button 355, the user may be presented with a list of options for the adjacent record, including the option to reserve the adjacent record.

Figure 4:
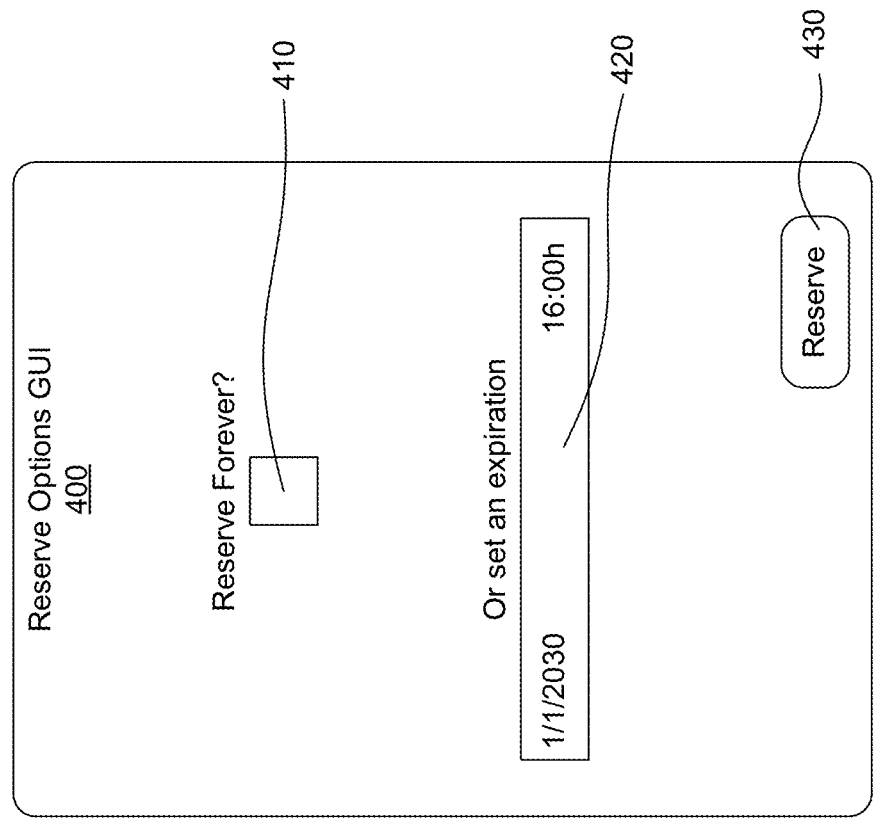

FIG. 4 shows an example GUI 400 for managing a databank system in accordance with one or more embodiments. Specifically, GUI 400 is a reserve options GUI and used to reserve a record. GUI 400 may correspond to GUI 110, discussed above in reference to FIG. 1. GUI 400 may also have the GUI functionality discussed in steps 715 of FIG. 7. GUI 400 may be invoked upon selection of an options button 355 adjacent to a record.

As shown in FIG. 4, GUI 400 includes a reserve forever checkbox 410. By manipulating (e.g., selecting) the reserve forever checkbox 410 and then manipulating reserve button 430, the user can request that the record be reserved indefinitely (e.g., until the user or a system administrator releases the reserve from the record). As also shown in FIG. 4, GUI 400 includes a textbox 420. The user may populate textbox 420 with an expiration (e.g., date and/or time). By populating textbox 420 and then manipulating the reserve button 430, the user can request that the record be reserved until the specified expiration. Intermediate system 112 may receive the reserve request and transmit an API call to API 120 to reserve the record until the expiration (if specified). Databank system 150 will prevent other users or other software applications from viewing, modifying, or accessing the reserved record in response to the API call.

Figure 5:
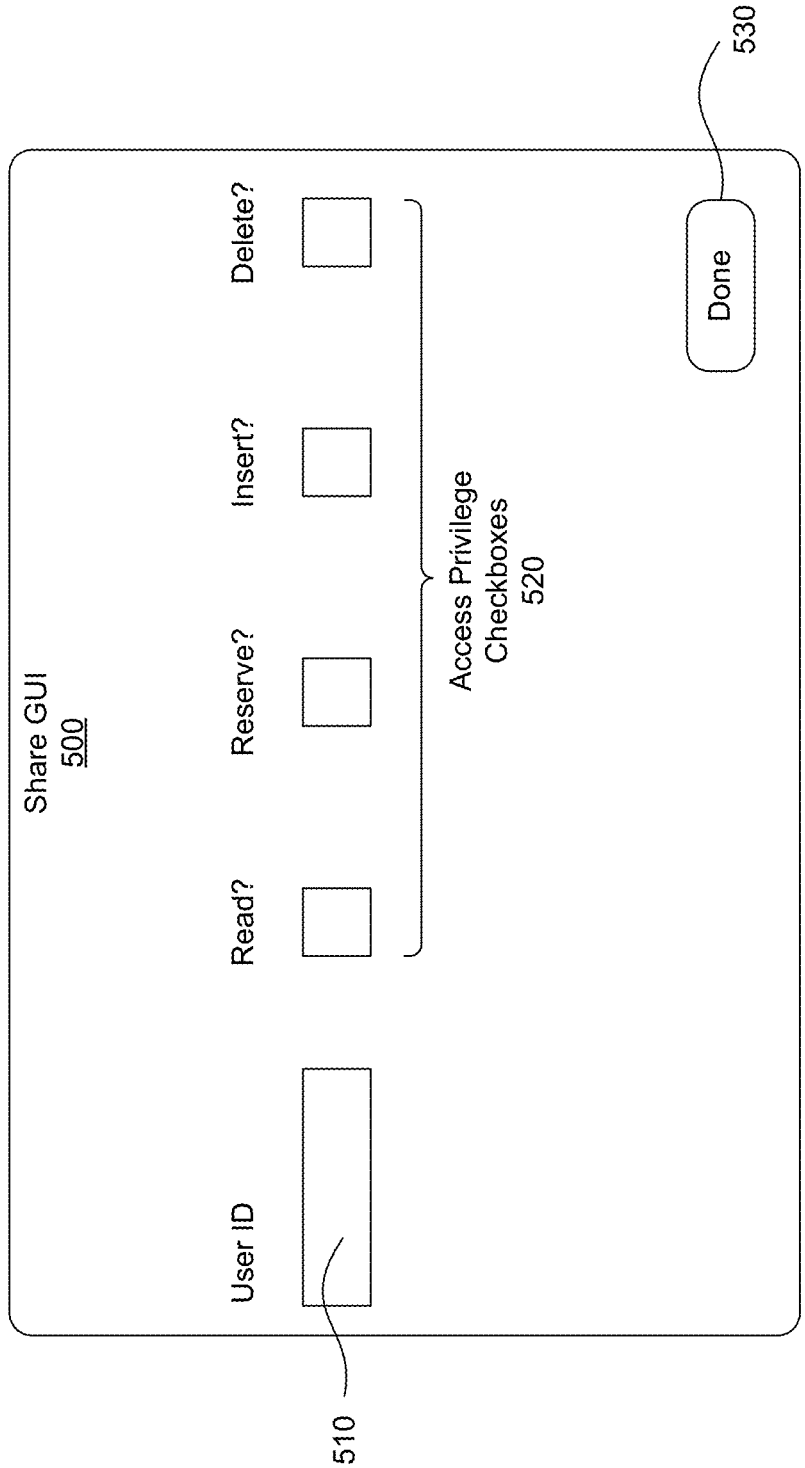

FIG. 5 shows an example GUI 500 for managing a databank system in accordance with one or more embodiments. Specifically, GUI 500 is a share GUI and used by an owner to share repositories or databanks. GUI 500 may correspond to GUI 110, discussed above in reference to FIG. 1. GUI 500 may also have the GUI functionality discussed in step 720 of FIG. 7. GUI 500 may be invoked in response to a share request from the user.

Each repository or each databank may have one or more owners. If a user is an owner of a repository or databank, the user may share the repository or databank with another user. Sharing the repository or databank may include granting one or more access privileges to another user including: rights to read records in the repository or databank, rights to reserve records in the repository or databank, rights to insert records in the repository or databank, rights to delete records in the repository or databank, etc.

As shown in FIG. 5, share GUI 500 has a textbox 510 for a user ID and multiple checkboxes corresponding to different access privileges 520. In order to share the repository or databank with a user, the owner of the repository or databank may populate textbox 510 with the identification (e.g., email address, username, etc.) of the user. The owner also checks one or more checkboxes 520 to specify the access privileges for the user. For example, if the owner wants the user to have read-only access to the databank or repository, the owner selects the "read" checkbox. If the owner wants to enable the user to reserve records in the repository or databank (discussed above), the owner selects the "reserve" checkbox. If the owner wants to enable the user to insert and/or delete records, the owner selects the "insert" checkbox and/or "delete" checkbox, respectively. users.

By populating textbox 510 with a user ID, selecting one or more of the checkboxes 520, and then manipulating the done button 530, the owner can request that the repository or databank be shared with the user according to the specified access privileges. Intermediate system 112 may receive the share request and transmit an API call to API 120 to share the databank or repository accordingly.

Figure 6:
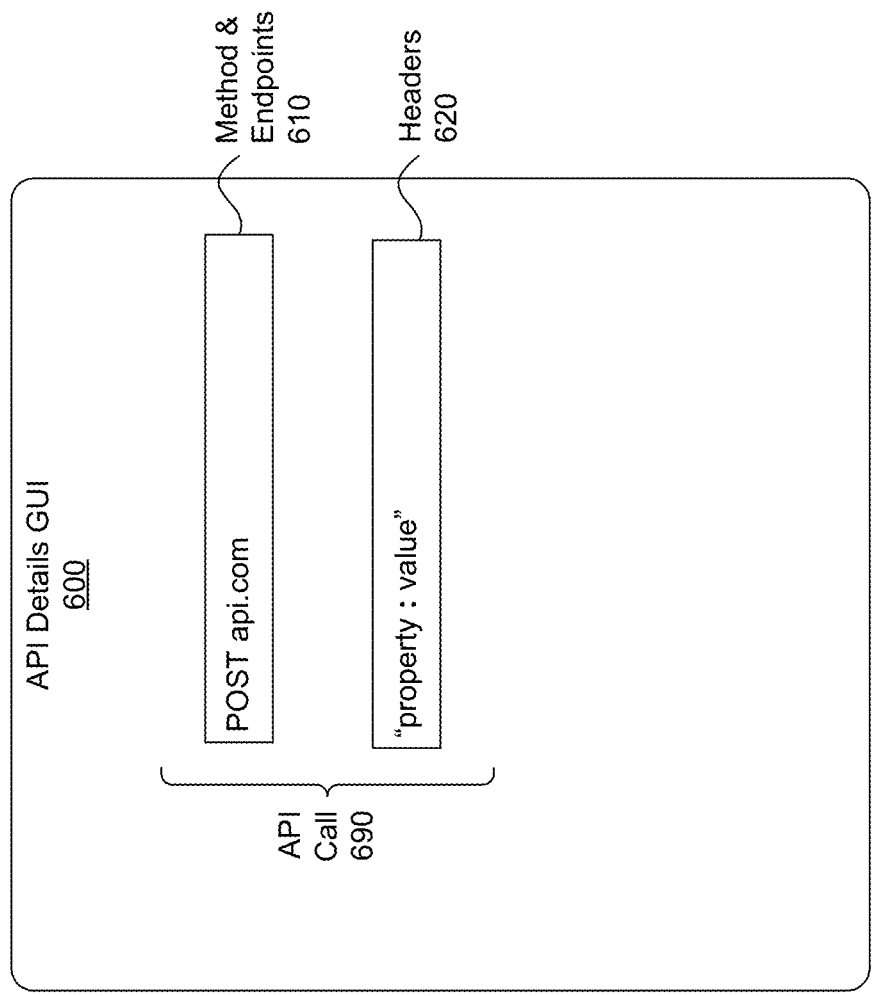

FIG. 6 shows an example GUI 600 for managing a databank system in accordance with one or more embodiments. Specifically, GUI 600 is an API details GUI and used to display API commands transmitted to API 120. GUI 600 may correspond to GUI 110, discussed above in reference to FIG. 1. GUI 600 may have the GUI functionality discussed in step 725 of FIG. 7. GUI 600 may be invoked in response to a user request to display a recently transmitted API call to API 120.

As shown in FIG. 6, API details GUI 600 displays an API call 690 transmitted from intermediate system 112 to API 120. In one or more embodiments, GUI 600 utilizes multiple textboxes to display API call 690. For example, textbox 610 may be used to display the method and endpoints of API call 690, while textbox 620 may be used to display the headers and body of API call 690. In other embodiments, more than two textboxes are utilized to display API call 690. In one or more embodiments, the entirety of API call 690 may be displayed in a single textbox.

In one or more embodiments, a user may copy displayed API call 690 and paste API call 690 (or a modified version of API call 690) into the code of another application (e.g., auxiliary application 105). This enables the other application (e.g., auxiliary application 105) to transmit API call 690 to API 120 and manage databank system 150.

FIG. 8A and FIG. 8B shows example API calls in accordance with one or more embodiments. For example, FIG. 8A shows example API calls 805A, while FIG. 8B shows example API calls 805B. These example API calls 805 may correspond to the API calls discussed above in reference to step 730 of FIG. 7.

Example API calls 805A include API calls regarding the health of a databank, the owners of a databank or repository, the sharing of a databank or repository, templates for a repository, etc. Example API calls 805B include requests to create databanks or repositories, to query a repository and retrieve data from a repository, to identify repositories based on tags, etc.

Figure 9:
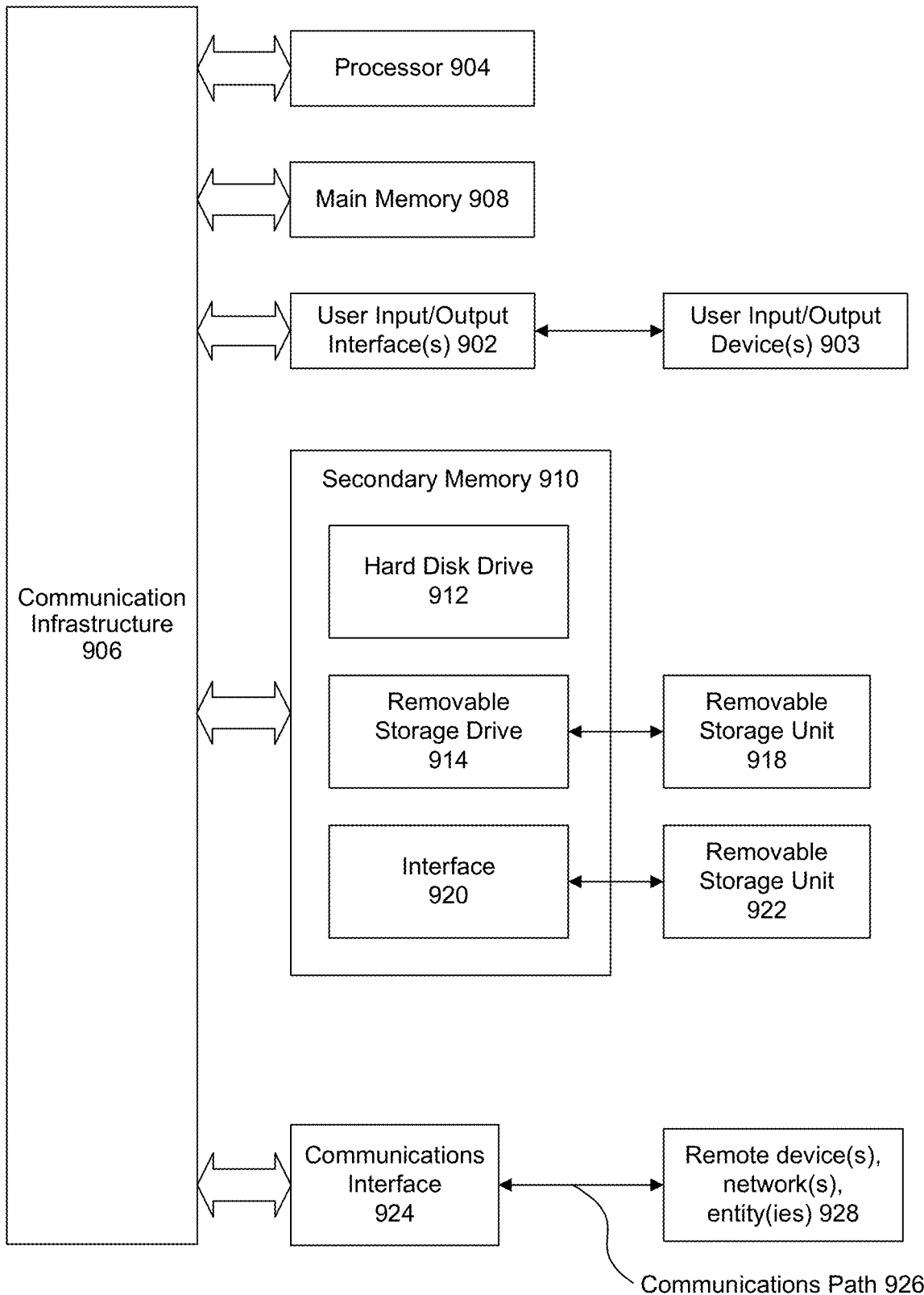
FIG. 9 shows an example computer system useful for implementing various embodiments.

Various embodiments can be implemented, for example, using one or more computer systems, such as computer system 900 shown in FIG. 9. Computer system 900 can be used, for example, to implement the process shown in FIG. 7. Computer system 900 can also be used to implement the GUI examples shown in FIGS. 2-6. Computer system 900 can be any computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   causing a graphical user interface (GUI) to be displayed, the GUI comprising a plurality of records from a repository managed by a databank system;
   receiving, via the GUI, a request from a first user to reserve a record of the plurality of records, wherein the request is issued in response to the first user manipulating an element within the GUI; and
   transmitting, to an application programming interface (API) associated with the databank system, an API access control call instructing the databank system to reserve the record, the API access control call comprising:
      a request uniform resource locator (URL) specifying a name of the repository; and
      a body comprising an identification of the record and a first identification of the first user, wherein the databank system is configured to prevent a second user with a second identification different from the first identification from accessing the record while the record is reserved.

2. The method of claim 1, wherein the API access control call further instructs the databank system to reserve the record until an expiration specified in the body.

3. The method of claim 1, further comprising:
receiving, via the GUI, a request to highlight one or more records that are reserved by a user; and
causing the reserved one or more records to be highlighted in the GUI in response to the request to highlight.

4. The method of claim 1, further comprising:
receiving, via the GUI, a request to share the repository with another user, the request to share specifying an access privilege; and
transmitting, to the API associated with the databank system, an API call instructing the databank system to share the repository with the another user based on the access privilege.

5. The method of claim 1, further comprising:
receiving, via the GUI, a request to show owners associated with the plurality of records; and
causing the GUI to display ownership information for the plurality of records.

6. The method of claim 1, further comprising:
receiving, via the GUI, a request to display an API call for requesting another record of the plurality of records; and
causing the GUI to display the API call for requesting the another record.

7. The method of claim 1, wherein the plurality of records correspond to credit card test data and wherein the API is a representational state transfer (REST) API.

8. A system, comprising:
a memory; and
a processor coupled to the memory and configured to:
cause a graphical user interface (GUI) to be displayed, the GUI comprising a plurality of records from a repository managed by a databank system;
receive, via the GUI, a request from a first user to reserve a record of the plurality of records, wherein the request is issued in response to the first user manipulating an element within the GUI; and
transmit, to an application programming interface (API) associated with the databank system, an API access control call instructing the databank system to reserve the record, the API access control call comprising:
a request uniform resource locator (URL) specifying a name of the repository; and
a body comprising an identification of the record and a first identification of the first user,
wherein the databank system is configured to prevent a second user with a second identification different from the first identification from accessing the record while the record is reserved.

9. The system of claim 8, wherein the API access control call further instructs the databank system to reserve the record until an expiration specified in the body.

10. The system of claim 8, wherein the processor is further configured to:
receive, via the GUI, a request to highlight one or more records that are reserved by a user; and
cause the reserved one or more records to be highlighted in the GUI in response to the request to highlight.

11. The system of claim 8, wherein the processor is further configured to:
receive, via the GUI, a request to share the repository with another user, the request to share specifying an access privilege; and
transmit, to the API associated with the databank system, an API call instructing the databank system to share the repository with the another user based on the access privilege.

12. The system of claim 8, wherein the processor is further configured to:
receive, via the GUI, a request to show owners associated with the plurality of records; and
cause the GUI to display ownership information for the plurality of records.

13. The system of claim 8, wherein the processor is further configured to:
receive, via the GUI, a request to display an API call for requesting another record of the plurality of records; and
cause the GUI to display the API call for requesting the another record.

14. The system of claim 8, wherein the plurality of records correspond to credit card test data and wherein the API is a representational state transfer (REST) API.

15. A non-transitory computer readable medium having instructions stored thereon that, when executed by at least one computing device, cause the at least one computing device to perform operations comprising:
causing a graphical user interface (GUI) to be displayed, the GUI comprising a plurality of records from a repository managed by a databank system;
receiving, via the GUI, a request from a first user to reserve a record of the plurality of records, wherein the request is issued in response to the first user manipulating an element within the GUI; and
transmitting, to an application programming interface (API) associated with the databank system, an API access control call instructing the databank system to reserve the record, the API access control call comprising:
a request uniform resource locator (URL) specifying a name of the repository; and
a body comprising an identification of the record and a first identification of the first user,
wherein the databank system is configured to prevent a second user with a second identification different from the first identification from accessing the record while the record is reserved.

16. The non-transitory computer readable medium of claim 15, wherein the API access control call further instructs the databank system to reserve the record until an expiration specified in the body.

17. The non-transitory computer readable medium of claim 15, the operations further comprising:
receiving, via the GUI, a request to highlight one or more records that are reserved by a user; and
causing the reserved one or more records to be highlighted in the GUI in response to the request to highlight.

18. The non-transitory computer readable medium of claim 15, the operations further comprising:
receiving, via the GUI, a request to share the repository with another user, the request to share specifying an access privilege; and transmitting, to the API associated with the databank system, an API call instructing the databank system to share the repository with the another user based on the access privilege.

19. The non-transitory computer readable medium of claim 15, the operations further comprising:
receiving, via the GUI, a request to show owners associated with the plurality of records; and
causing the GUI to display ownership information for the plurality of records.

20. The non-transitory computer readable medium of claim 15, the operations further comprising:
receiving, via the GUI, a request to display an API call for requesting another record of the plurality of records; and
causing the GUI to display the API call for requesting the another record.

\* \* \* \* \*